No. 859,757. PATENTED JULY 9, 1907.
A. GAILLARD.
APPARATUS FOR CONCENTRATING SULFURIC ACID.
APPLICATION FILED MAR. 25, 1907.
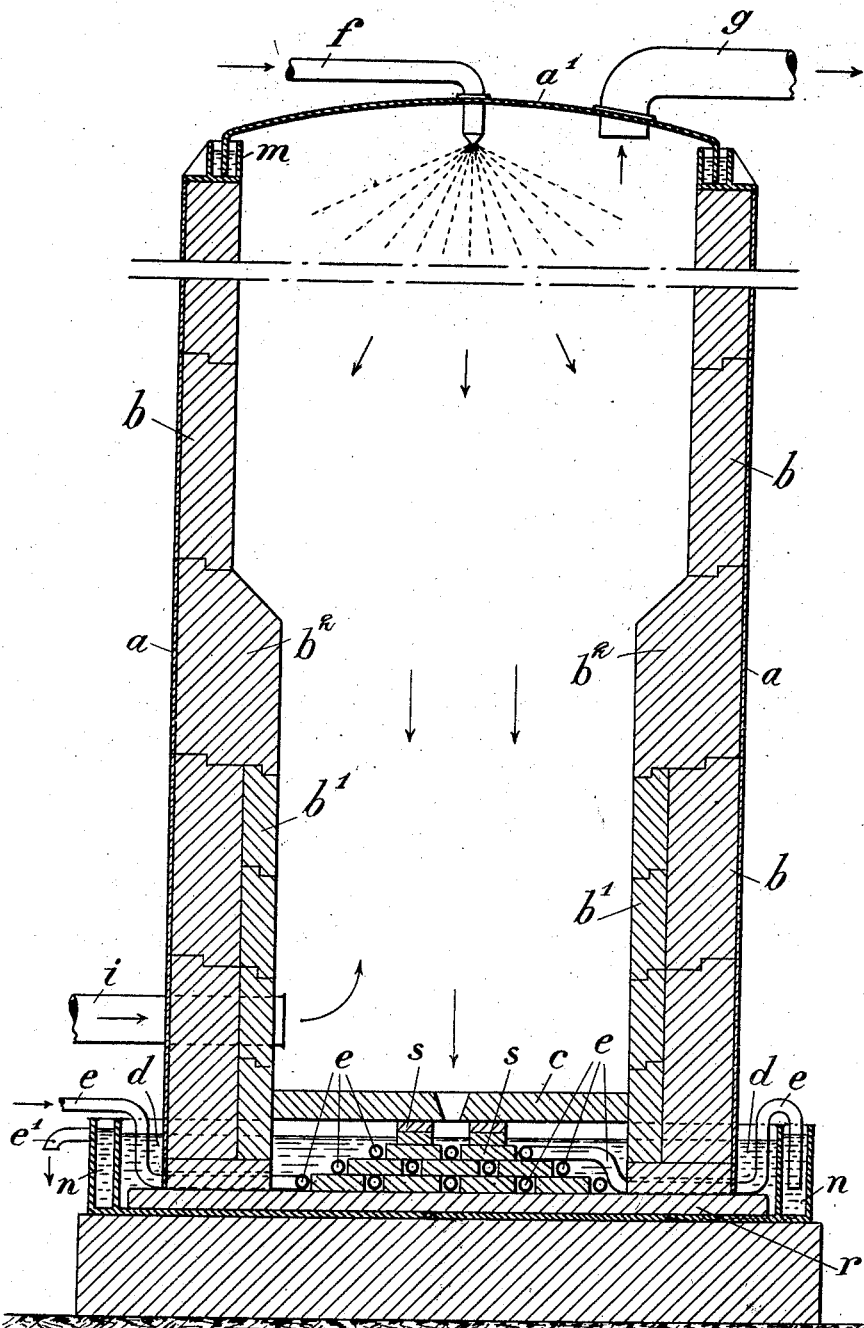
Witnesses.
Inventor
Antonio Gaillard
attorneys.

UNITED STATES PATENT OFFICE.

ANTONIO GAILLARD, OF BARCELONA, SPAIN.

APPARATUS FOR CONCENTRATING SULFURIC ACID.

No. 859,757.     Specification of Letters Patent.     Patented July 9, 1907.

Application filed March 25, 1907. Serial No. 364,532.

*To all whom it may concern:*

Be it known that I, ANTONIO GAILLARD, manufacturer, a citizen of the French Republic, residing at Barcelona, Spain, Plaza de Palacio, No. 6, have invented certain new and useful Improvements in Apparatus for the Concentration of Sulfuric Acid; and I do hereby declare the following to be a full, clear, and exact description of the invention, such as will enable others skilled in the art to which it appertains to make and use the same.

My invention relates to apparatus for the concentration of sulfuric acid, the present invention being an improvement upon my former application, Serial No. 297,695, filed January 24, 1906.

The apparatus in general is composed of a vertical tower which stands inside of a receptacle or tank in which the concentrated acid accumulates. Near the bottom of this tower is located a perforated plate of refractory material which separates the concentrated acid from the hot gases inside the tower.

The invention comprises an inner coating or wall of refractory stone for the lower part of the tower, which may be changed without disturbing the tower, and which is interlocked at the top with the outer coating or wall; a perforated refractory plate above the bottom of the tank in which the concentrated acid accumulates in order to protect this tank from the action of the hot acid; an outer receptacle surrounding said tank and in which said tank rests, said receptacle being provided with cooling means; and at the upper part of the tower a movable cover closed by a hydraulic seal through which enters the pipe through which the acid to be concentrated is sprayed, and through which cover the outlet pipe for the gas leads.

In the accompanying drawing, the figure is a vertical cross section of the tower.

This tower or chamber is constructed of pieces of volvic stone $b$, or other suitable acid and heat resisting material, the blocks of which interlock with each other at the top and bottom, the whole tower being surrounded by a covering $a$ of lead.

The lower internal part of the tower is provided with a coating of refractory blocks or stones $b^1$, which are interlocked together and the upper one of which interlocks with the projecting central stone of block $b^2$. This lower coating or layer may be changed or removed when worn. The reason for using this extra layer is that it is well known that sulfuric acid when hot and highly concentrated (96.99 per cent of $H_2SO_4$) attacks the material of which the tower is composed. In my apparatus, the stones or blocks in the lower part of the tower are well protected to a certain height from the action of the heat, and from the contact with the concentrated acid in its stronger form by means of the internal coating $b^1$. Only this inner coating $b^1$ is directly in contact with the hot gases, the vapors, and with an acid concentrated more than to contain 78.8 per cent of pure sulfuric acid. In other words, the upper portion of the tower is not attacked in any serious degree in the concentration process. This coating $b^1$ may be changed very quickly, and at a very low cost, and after it has been changed, the whole chamber becomes almost as good as new without having to pull down the tower and build it up again.

The tower rests upon a plate $r$ of refractory material, which plate rests upon the bottom of a receptacle $d$ adapted to receive the concentrated sulfuric acid, and which receptacle is provided with an outer casing $n$, the whole being made in one piece and adapted to contain water or other cooling material.

$i$ represents the inlet for the hot gases, and $g$ represents a discharge pipe therefor.

The top of the tower is provided with an annular receptacle $m$, preferably made of lead or some suitable acid resisting material and having two walls, whereby an annular trough is formed, to which the top $a^1$ of the tower is adapted to rest, the space in said trough being filled with water to form a hydraulic seal.

$f$ represents a pipe coming in through the center of the tower $a^1$ and provided with a nozzle so that the acid which is forced in at the top of the tower may be finely sprayed.

Underneath the pipe $i$, the bottom of the tower is closed by a plate $c$ of refractory material, having a perforation therein for delivering the concentrated acid into the receptacle $d$. The central part of this plate rests upon a series of blocks $s$, which in turn rest upon the plate $r$. $e$ represents a pipe which is coiled around, through and among the blocks $s$ for the purpose of supplying water to cool the hot acid as it drips down through the plate $c$. The end of this pipe delivers into the outer receptacle $n$, and is provided with an overflow pipe $e'$. Suitable means, not shown, are, of course, provided for drawing the concentrated acid out of the receptacle $d$.

Having thus described my invention, I claim:—

1. An apparatus for the concentration of sulfuric acid, including a tower having an unobstructed interior built up of blocks of acid resisting material, a leaden casing inclosing said blocks, said blocks being interlocked together, and an inner coating or wall of blocks of refractory material in the lower part of the tower, said inner wall being composed of blocks interlocking with each other and with the outer wall, substantially as described.

2. In an apparatus for the concentration of sulfuric acid, the combination of a tower having an unobstructed interior, said tower being composed of interlocked blocks of refractory material and a lead casing therefor, and being provided in its lower portion with an inner coating or wall of refractory material composed of blocks interlocked together and interlocked with the outer coating, a receptacle for the reception of the concentrated acids, and a refractory plate in said receptacle upon which said tower rests, substantially as described.

3. In an apparatus for the concentration of sulfuric acid, the combination of a vertical tower composed of blocks of refractory material interlocked together and surrounded by a lead casing and having at its lower part an inner coating or wall made of blocks of refractory material interlocked together and with the outer coating, a receptacle in which the concentrated acid is received, a plate in said receptacle on which said tower rests, a receptacle surrounding the acid receptacle, and means for circulating water through both of said receptacles, substantially as described.

4. In an apparatus for the concentration of sulfuric acid, the combination of a vertical tower composed of blocks of refractory material interlocked together and having a lead casing, an interior wall at the lower part of the tower composed of blocks of refractory material interlocking with each other and with the outer wall, a receptacle in which the concentrated acid accumulates, a refractory plate in said receptacle on which said tower rests, an exterior receptacle surrounding the acid receptacle, means for causing a current of water to circulate through said receptacles, a cover for the upper part of said tower, and a hydraulic seal for said cover, substantially as described.

5. In an apparatus for the concentration of sulfuric acid, the combination of a vertical tower made of blocks of refractory material interlocked together, a lead casing surrounding the same, an inner coating or wall of refractory material for the lower part of the tower composed of blocks interlocking with each other and with the outer coating, a perforated plate closing the lower part of said tower, a receptacle for the concentrated acid, a refractory plate in said receptacle upon which said tower rests, a second receptacle surrounding said first-named receptacle, means for causing water to circulate through both of said receptacles, a cover for the top of said tower, a liquid seal therefor, an inlet pipe provided with a nozzle for delivering the weak sulfuric acid into said tower, and gas inlet and outlet pipes, substantially as described.

In testimony whereof, I affix my signature, in presence of two witnesses.

ANTONIO GAILLARD.

Witnesses:
STANLEY C. HARRIS,
CONSTANTINO LOPEZ CIOLO.